United States Patent
Itoyama et al.

(10) Patent No.: US 11,572,157 B2
(45) Date of Patent: Feb. 7, 2023

(54) PRESSURE SENSOR AND MOVING DEVICE HAVING PRESSURE SENSOR

(71) Applicant: OMRON Corporation, Kyoto (JP)

(72) Inventors: Kazuki Itoyama, Moriyama (JP);
Yoshitaka Adachi, Kyoto (JP);
Katsuyuki Yamamoto, Kusatsu (JP);
Daisuke Morihara, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 250 days.

(21) Appl. No.: 16/765,487

(22) PCT Filed: Dec. 6, 2018

(86) PCT No.: PCT/JP2018/044972
§ 371 (c)(1),
(2) Date: May 20, 2020

(87) PCT Pub. No.: WO2019/124102
PCT Pub. Date: Jun. 27, 2019

(65) Prior Publication Data
US 2020/0324881 A1 Oct. 15, 2020

(30) Foreign Application Priority Data
Dec. 20, 2017 (JP) .............................. JP2017-243906

(51) Int. Cl.
*B64C 19/02* (2006.01)
*G01L 9/00* (2006.01)
*G01L 19/06* (2006.01)

(52) U.S. Cl.
CPC ............ *B64C 19/02* (2013.01); *G01L 9/0042* (2013.01); *G01L 19/06* (2013.01)

(58) Field of Classification Search
CPC .............................. G01L 9/0042; G01L 19/06
(Continued)

(56) References Cited

U.S. PATENT DOCUMENTS 7,981,182 B2 * 7/2011 Volchko ............. F02M 37/0082
210/336
8,989,924 B2 * 3/2015 Seydoux ................ G01C 5/005
701/4
(Continued)

FOREIGN PATENT DOCUMENTS

CN         1058649 A     2/1992
CN       203585695 U     5/2014
(Continued)

OTHER PUBLICATIONS

English translation of CN108036891 accessed from worldwide. espacenet.com Oct. 7, 2022.*
(Continued)

*Primary Examiner* — David Z Huang
*Assistant Examiner* — Jean F Morello
(74) *Attorney, Agent, or Firm* — Metrolex IP Law Group, PLLC (57) ABSTRACT

A pressure sensor includes a detection element that detects a change in pressure, and a cover member that accommodates the detection element and that includes a first through hole and a second through hole. Each of the first through hole and the second through hole is provided at a position that does not overlap the detection element in a front view of the respective hole.

13 Claims, 12 Drawing Sheets

(58) Field of Classification Search
USPC .......................................................... 244/175
See application file for complete search history.

(56) References Cited

U.S. PATENT DOCUMENTS

| | | | | |
|---|---|---|---|---|
| 10,023,323 | B1* | 7/2018 | Roberts | B64C 39/024 |
| 10,670,481 | B2* | 6/2020 | Ishihara | G01L 13/025 |
| 10,809,140 | B2* | 10/2020 | Duqi | G01L 9/0054 |
| 2003/0019298 | A1* | 1/2003 | Scheurich | G01L 19/0627 |
| | | | | 73/715 |
| 2008/0315333 | A1* | 12/2008 | Combi | B81C 1/0023 |
| | | | | 257/E23.193 |
| 2015/0273956 | A1 | 10/2015 | Biegner et al. | |
| 2017/0041692 | A1 | 2/2017 | Watson et al. | |
| 2017/0276564 | A1 | 9/2017 | Takeuchi et al. | |
| 2018/0146312 | A1 | 5/2018 | Kono et al. | |
| 2021/0095964 | A1* | 4/2021 | Yin | G01C 5/06 |

FOREIGN PATENT DOCUMENTS

| | | | | |
|---|---|---|---|---|
| CN | 103968984 A | | 8/2014 | |
| CN | 104101459 A | | 10/2014 | |
| CN | 105043428 A | | 11/2015 | |
| CN | 206074175 U | | 4/2017 | |
| CN | 108036891 A | * | 5/2018 | ......... G01L 19/0609 |
| JP | H10-325769 A | | 12/1998 | |
| JP | 2001-194265 A | | 7/2001 | |
| JP | 2010-136091 A | | 6/2010 | |
| JP | 2015-178994 A | | 10/2015 | |
| JP | 2017-173016 A | | 9/2017 | |
| WO | 2016/171160 A1 | | 10/2016 | |
| WO | 2017/037238 A1 | | 3/2017 | |

OTHER PUBLICATIONS

The Office Action dated Mar. 26, 2021 and English translation in a related Chinese patent application.
An English translation of the International Search Report ("ISR") of PCT/JP2018/044972 dated Feb. 26, 2019.
The Written Opinion("WO") of PCT/JP2018/044972 dated Feb. 26, 2019.
The International Preliminary Report on Patentability (Chapter II of the Patent Cooperation Treaty) of PCT/JP2018/044972 dated Jan. 31, 2020.

* cited by examiner

PRESSURE SENSOR AND MOVING DEVICE HAVING PRESSURE SENSOR

TECHNICAL FIELD

The present invention relates to a pressure sensor and a moving device having a pressure sensor.

BACKGROUND ART

A pressure sensor for detecting pressure is used. A pressure sensor includes a pressure detection element that detects a change in pressure and a package member that protects the pressure detection element. The package member of the pressure sensor is provided with an introduction hole for introducing pressure into the inside of the package member. The atmospheric pressure outside the package member is introduced into the inside of the package member through the introduction hole, and the pressure detection element detects the introduced pressure.

Patent Document 1 discloses, for example, a semiconductor pressure sensor including a pressure detection element, a pedestal that supports the pressure detection element, and a package that has an introduction hole for introducing pressure to be measured into the pressure detection element, to which the pedestal is fixed, and that accommodates the pressure detection element and the pedestal, wherein an elastic buffer member is mixed in an adhesive that bonds the pedestal and the package. The semiconductor pressure sensor according to Patent Document 1 can absorb external forces and distortion by the adhesive in which the buffer member is mixed, and therefore can reduce a decrease in accuracy of pressure measurements when an external force or the like is applied to the package.

RELATED ART DOCUMENT

Patent Document

Patent Document 1: JP H10-325769A

SUMMARY OF THE INVENTION

Problem to be Solved by the Invention

If wind enters the pressure sensor through the introduction hole, the wind that has entered the pressure sensor may press the pressure detection element, or the atmospheric pressure in the pressure sensor may increase, so that the pressure detection accuracy of the pressure detection element may decrease.

One aspect of the disclosed technique is to reduce a decrease in detection accuracy due to inflow of wind into a pressure sensor.

Means for Solving the Problems

One aspect of the disclosed technology is illustrated by the following pressure sensor. The pressure sensor includes a detection element that detects a change in pressure, and a cover member that accommodates the detection element and that includes a first through hole and a second through hole, wherein each of the first through hole and the second through hole is provided at a position that does not overlap the detection element in a front view of the respective hole.

The pressure sensor according to the disclosed technique is a sensor that detects external pressure introduced from at least one of the first through hole and the second through hole. The pressure to be measured by the pressure sensor is, for example, the atmospheric pressure around the cover member. Because the first through hole and the second through hole are provided at positions that do not overlap the detection element in a front view, the detection element is prevented from being directly pressed by the wind (air) flowing into the inside of the cover member from the first through hole or the second through hole. Because the wind flowing into the inside of the cover member from one of the first through hole and the second through hole is discharged from the other of the first through hole and the second through hole, an increase in pressure inside the cover member is reduced. As a result, according to the disclosed technique, a decrease in detection accuracy due to the inflow of wind into the pressure sensor can be reduced. Furthermore, by disposing the first through hole and the second through hole in this way, as compared with a pressure sensor in which an introduction hole is provided in a region overlapping a detection element when the introduction hole is viewed from the front, adhesion of dust, such as dust and dirt, to the detection element is reduced. Therefore, according to the disclosed technique, erroneous detection of pressure due to adhesion of dust is reduced.

The disclosed technique may also further have the following feature. The first through hole and the second through hole are disposed to face each other. According to such a technique, because the other of the first through hole and the second through hole is positioned in front of the traveling direction of the wind flowing into the pressure sensor from one of the first through hole and the second through hole, the flowing wind can be easily discharged from the other of the first through hole and the second through hole.

The disclosed technique may also further have the following feature. The cover member includes a wall portion that divides the inside of the cover member into a first chamber and a second chamber and that includes a communication hole that links the first chamber and the second chamber, the first through hole and the second through hole are provided in the second chamber of the cover member, and the detection element is accommodated in the first chamber. The communication hole may also be a hole provided in the wall portion, or may also be a gap between the wall portion and the inner wall of the cover member. Because the inflow of the wind that has flowed into the second chamber through the first through hole or the second through hole into the first chamber is blocked by the wall portion, an increase in pressure inside the first chamber provided with the detection element is reduced.

The disclosed technique may also further have the following feature. A normal on the opening of the first through hole and a normal on the opening of the communication hole are orthogonal to each other, and a normal on the opening of the second through hole and the normal on the opening of the communication hole are also orthogonal to each other. Because the first through hole, the second through hole, and the communication hole are disposed in this manner, the traveling direction of the wind flowing in from the first through hole or the second through hole is orthogonal to the direction connecting the first chamber and the second chamber through the communication hole, and the wind flowing in from the first through hole or the second through hole is suppressed from flowing into the first chamber.

The disclosed technique may also further have the following feature. The detection element is covered by a package member including an introduction hole, and the cover member accommodates the detection element, which is covered by the package member, in the first chamber. According to such a technique, by further covering the detection element covered by the package member including the introduction hole with the cover member, it is possible to suppress a decrease in detection accuracy due to wind flowing into the inside of the pressure sensor.

The disclosed technique may also be applied to the above-described pressure sensor and a moving device in which a moving means is provided on a cover member provided in the pressure sensor. The moving means of the moving device may also be a flying means.

Effects of the Invention

This pressure sensor can reduce a detection error due to the influence of wind.

EMBODIMENTS OF THE INVENTION

Hereinafter, embodiments will be described with reference to the drawings. The configurations of the embodiments described below are merely examples, and the disclosed technique is not limited to the configurations of the embodiments.

Application Example

A pressure sensor according to an application example includes a detection element that detects pressure, and a cover member that accommodates the detection element to cover the detection element, and that includes a first through hole and a second through hole. The detection element includes, for example, a diaphragm, and detects pressure based on displacement of the diaphragm when pressure is applied. The cover member protects the detection element from adhesion of dust, dirt, and the like, impact, and the like. The cover member is formed of, for example, resin or metal. In the pressure sensor according to the application example, the pressure outside the cover member is introduced into the inside of the pressure sensor through the first through hole and the second through hole. Because each of the first through hole and the second through hole is provided at a position that does not overlap the detection element in a front view, even if wind (air) flows into the inside of the pressure sensor through the first through hole or the second through hole, the detection element is prevented from being directly pressed by the flowing wind. Also, wind flowing into the inside of the pressure sensor from one of the first through hole and the second through hole is discharged from the other of the first through hole and the second through hole. Accordingly, an increase in atmospheric pressure inside the pressure sensor due to the inflow of wind is reduced. That is to say, the difference between the pressure inside the pressure sensor and the pressure around the pressure sensor is reduced. Therefore, according to the pressure sensor according to the application example, the influence of wind on the pressure detection accuracy is reduced.

The cover member of the pressure sensor according to the application example may also have a wall portion that divides the inside of the cover member into two: an accommodation chamber that accommodates the detection element and an introduction chamber that introduces pressure from the outside. A communication hole that communicates the accommodation chamber and the introduction chamber is provided in a part of the wall portion. The first through hole and the second through hole may also be provided on the introduction chamber side of the cover member to face each other. By dividing the inside of the cover member into the accommodation chamber and the introduction chamber by the wall portion, the wind flowing into the introduction chamber from the first through hole or the second through hole is suppressed from flowing into the accommodation chamber. Also, the wind flowing into the introduction chamber from one of the first through hole and the second through hole is easily discharged from the other of first through hole and the second through hole by being guided by the wall portion. Accordingly, the influence of wind on the pressure detection accuracy is further suppressed.

In the pressure sensor according to the application example, the communication hole may also be provided at a position where a normal on the opening of the first through hole and a normal on the opening of the communication hole are orthogonal to each other, and a normal on the opening of the second through hole and a normal on the opening of the communication hole are orthogonal to each other. Because the first through hole, the second through hole, and the communication hole are disposed in this manner, the direction of the wind flowing in from the first through hole or the second through hole is orthogonal to the direction connecting the introduction chamber and the accommodation chamber via the communication hole, and the wind flowing in from the first through hole or the second through hole is suppressed from flowing into the accommodation chamber.

The cover member may also accommodate the detection element, which is covered by the package member, in the accommodation chamber. The package member is provided with an introduction hole for introducing pressure to be measured into the inside of the package member. There is no limitation on the position where the introduction hole is provided. The introduction hole may also be provided at a position that does not overlap the detection element in a front view, or may also be provided at a position that overlaps the detection element in a front view. Because the package member is covered by the above-described cover member including the first through hole and the second through hole, even if the introduction hole is provided at a position that overlaps the detection element in a front view, wind is prevented from flowing into the inside of the package member from the introduction hole. Therefore, even with such a pressure sensor, the influence of wind on the pressure detection accuracy is reduced.

Embodiments

Figure 1A:
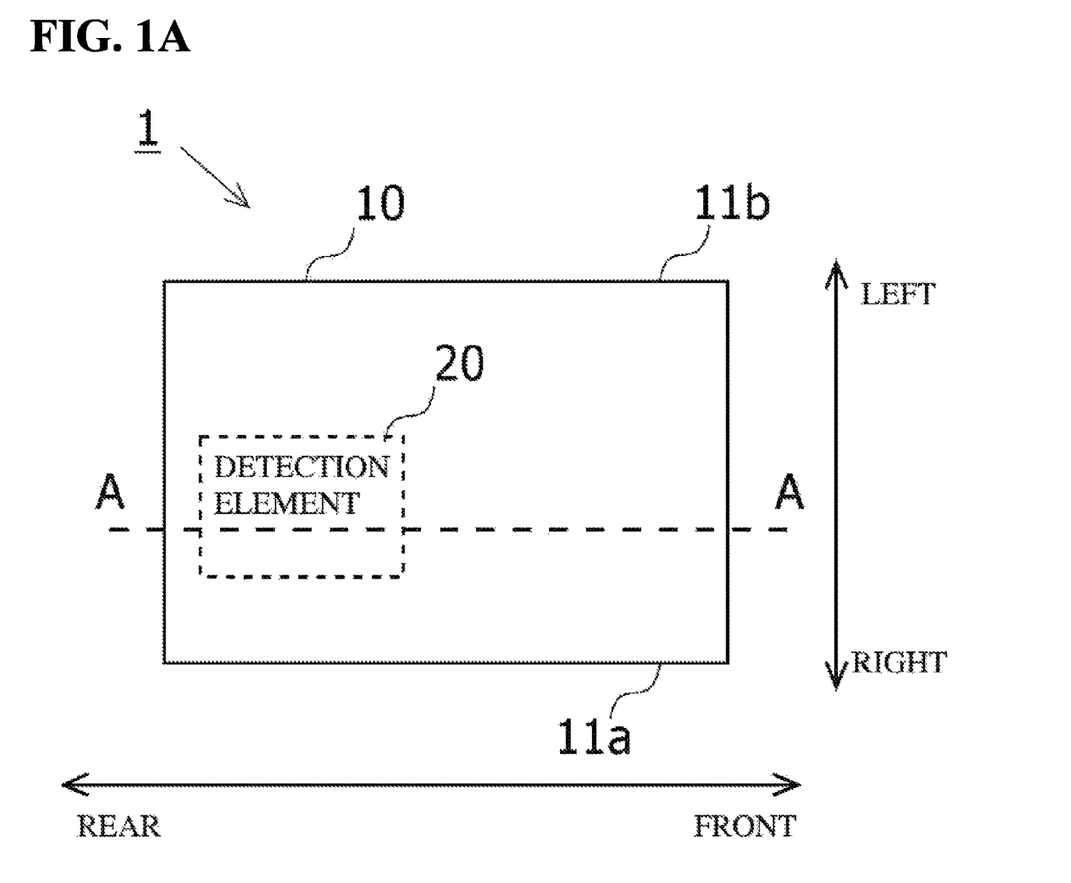
FIG. 1A is a first diagram illustrating an example of an appearance of a pressure sensor according to an embodiment.
Figure 1B:
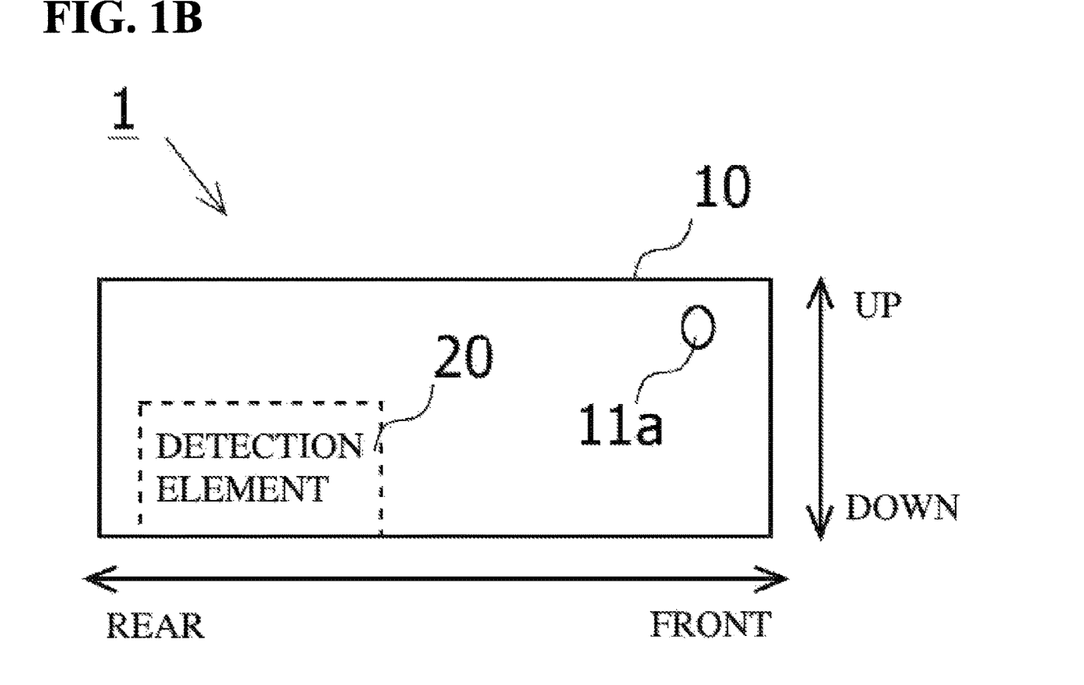
FIG. 1B is a second diagram illustrating an example of the appearance of the pressure sensor according to the embodiment.
Figure 1C:
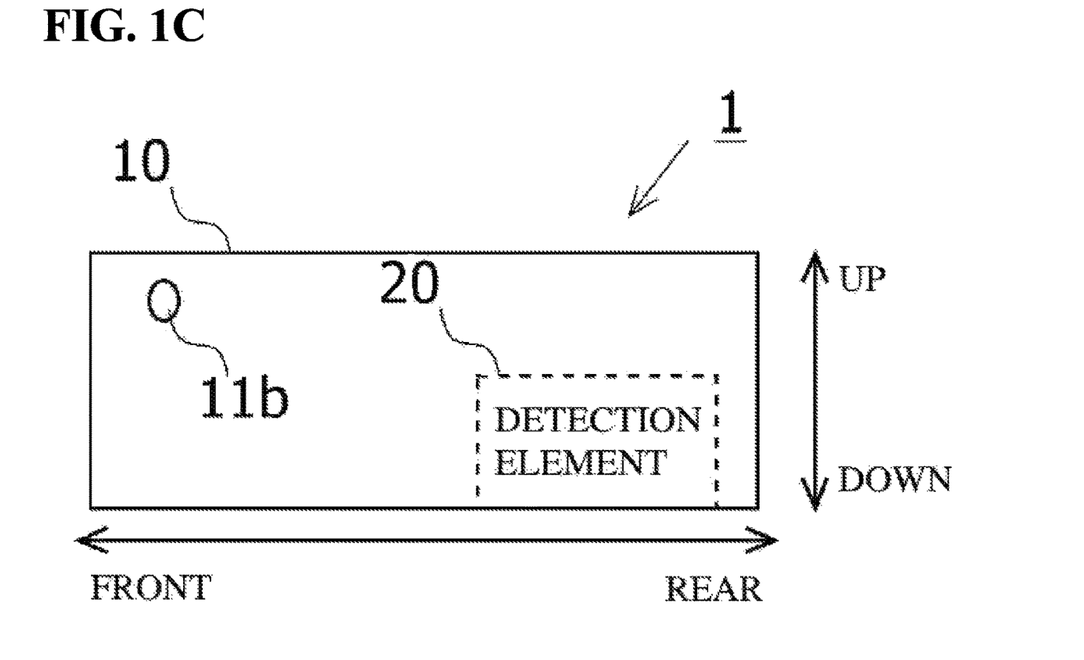
FIG. 1C is a third diagram illustrating an example of the appearance of the pressure sensor according to the embodiment.
Figure 1D:
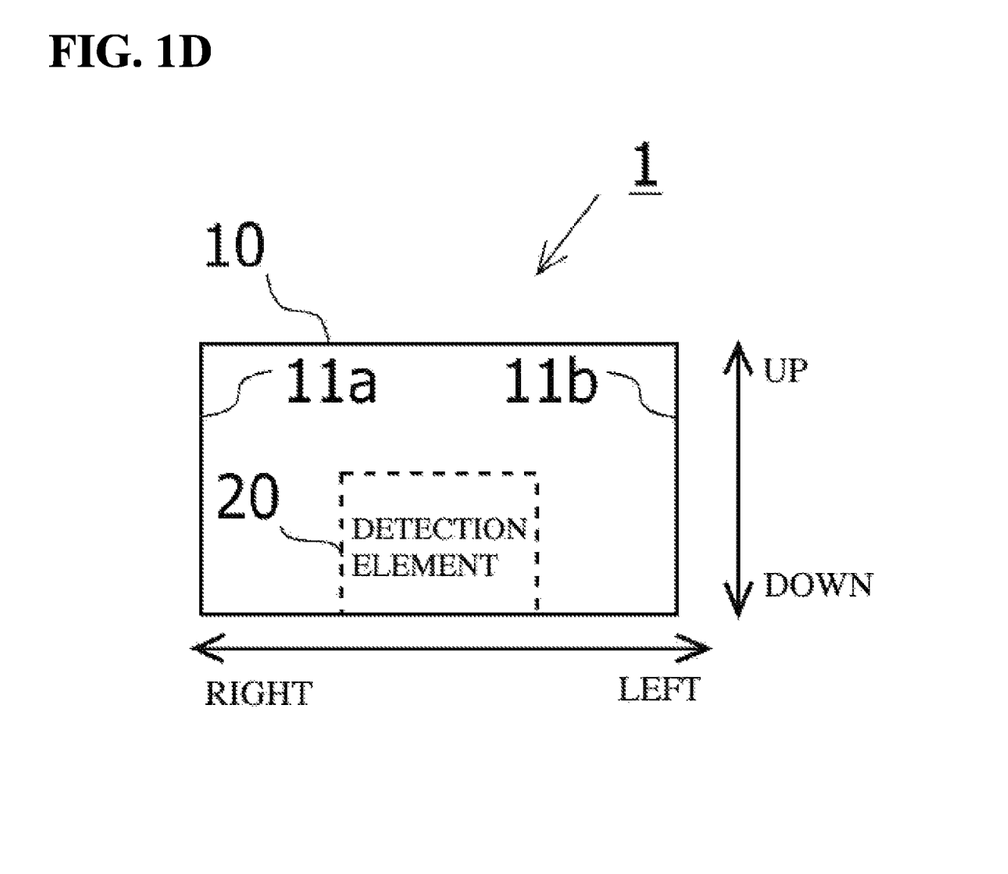
FIG. 1D is a fourth diagram illustrating an example of the appearance of the pressure sensor according to the embodiment.

The pressure sensor described in the application example will be described in more detail with reference to the drawings. FIGS. 1A to 1D are views showing an example of the appearance of a pressure sensor 1 according to an embodiment. FIG. 1A is an example of a view of the pressure sensor 1 as viewed from above, FIG. 1B is an example of a right side view of the pressure sensor 1, FIG. 1C is an example of a left side view of the pressure sensor 1, and FIG. 1D is an example of a front view of the pressure sensor 1. In FIGS. 1A to 1D, a detection element 20 installed in a cover member 10 is illustrated by a dotted line. The pressure sensor 1 includes the cover member 10. Although the cover member is illustrated as having a cuboid shape in FIGS. 1A to 1D, the shape of the cover member 10 is not limited to a cuboid shape.

The cover member 10 is a cover that protects the detection element 20. The cover member 10 accommodates the detection element to cover the surroundings of the detection element 20, thereby protecting the detection element 20 from adhesion of dust, dirt, and the like, as well as from impacts, and the like. As shown in FIGS. 1B and 1C, through holes 11a and 11b are provided in the right side wall and the left side wall of the cover member 10, respectively. The change in pressure outside the cover member 10 is transmitted to the detection element 20 through the through holes 11a and 11b. The through holes 11a and 11b are provided at positions where wind flowing into the pressure sensor 1 from the outside of the cover member 10 through the through holes 11a and 11b does not directly hit the detection element 20. The through holes 11a and 11b are provided at positions, for example, where the normals on the openings thereof are orthogonal to the normal on a detection surface 20a. The through holes 11a and 11b are preferably provided at positions where the detection element 20 is not interposed between the through holes 11a and 11b. Because the detection element 20 is not interposed between the through holes 11a and 11b, the wind flowing into the pressure sensor from the through holes 11a and 11b is suppressed from hitting the detection element 20, and a decrease in detection accuracy due to the wind flowing into the pressure sensor 1 is reduced.

Figure 2:
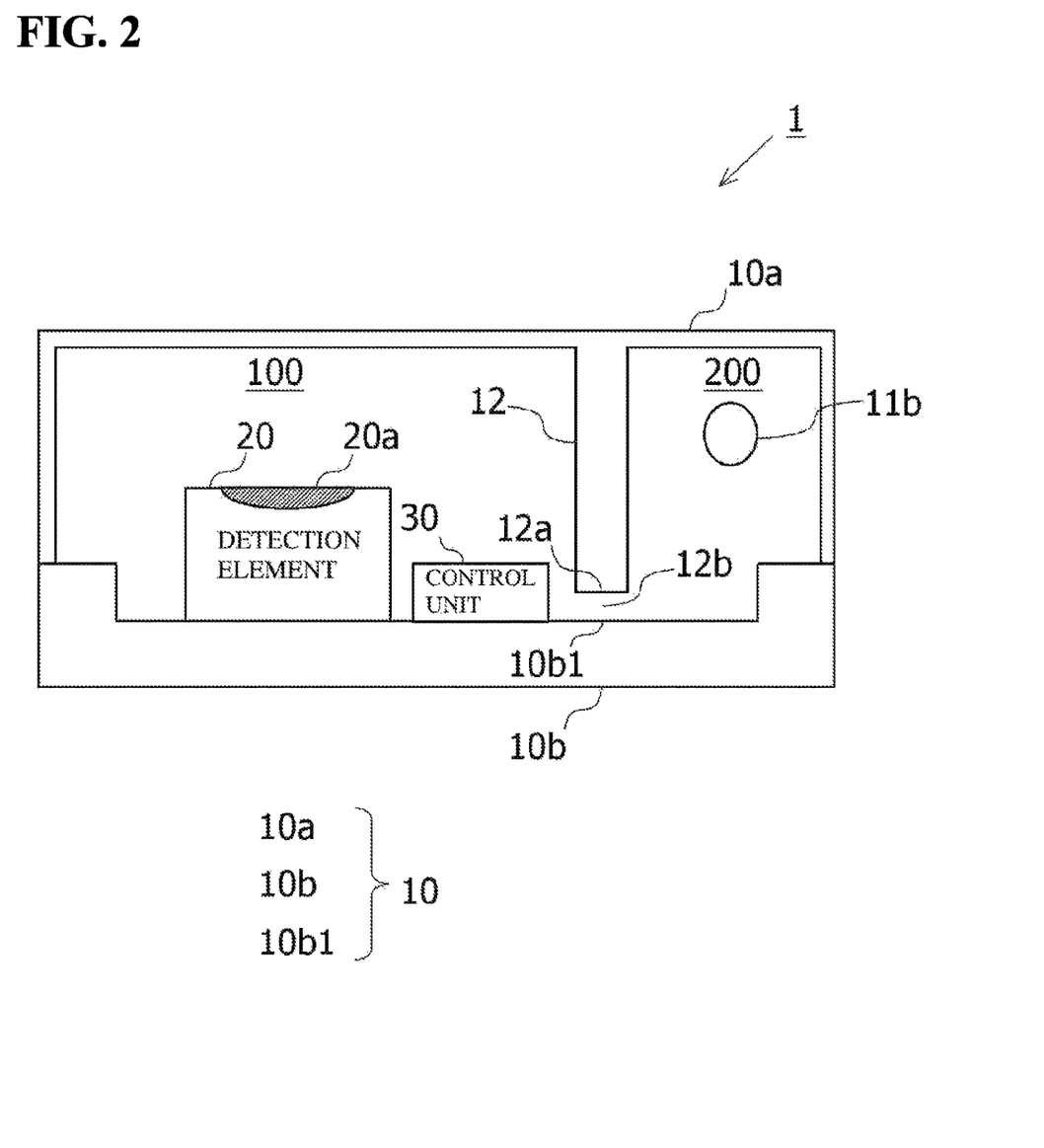
FIG. 2 is an example of a cross-sectional view taken along line A-A in FIG. 1A.

FIG. 2 is an example of a cross-sectional view taken along line A-A in FIG. 1A. The cover member 10 includes an upper cover 10a and a lower cover 10b. The upper cover 10a includes a wall portion 12 protruding from the inner wall of the upper cover 10a toward the lower cover 10b. A gap 12b is interposed between an end portion 12a of the wall portion 12 and the bottom surface 10b1 of the lower cover 10b. The wall portion 12 divides the inside of the cover member 10 into an accommodation chamber 100 and an introduction chamber 200.

The above-described through holes 11a and 11b are provided in the introduction chamber 200. The pressure outside the pressure sensor 1 introduced through the through holes 11a and 11b is introduced into the accommodation chamber 100 via the gap 12b. Also, the wind flowing into the introduction chamber 200 from one of the through holes 11a and 11b is prevented from flowing into the accommodation chamber 100 by the wall portion 12, and is discharged from the other of the through holes 11a and 11b. The introduction chamber 200 is an example of a "second chamber".

In the accommodation chamber 100, the detection element 20 is placed on the bottom surface 10b1 of the lower cover 10b with the detection surface 20a facing the upper cover 10a. A predetermined wiring pattern (not shown) is provided in a region on the accommodation chamber 100 side of the bottom surface 10b1 of the lower cover 10b, and the detection element 20 and a control unit 30 are connected by the wiring pattern. As described above, the pressure outside the cover member 10 is introduced into the accommodation chamber 100 through the through holes 11a and 11b and the gap 12b. The pressure introduced into the accommodation chamber 100 is detected by the detection surface 20a of the detection element 20. The accommodation chamber 100 is an example of a "first chamber". The gap 12b is an example of a "communication hole".

The detection element 20 is, for example, a MEMS (Micro Electro Mechanical Systems) device that detects pressure. The detection element 20 is, for example, an absolute pressure sensor that includes a diaphragm on the detection surface 20a, and that outputs a detection value corresponding to the pressure based on the displacement of the diaphragm caused by a change in the pressure applied to the detection surface 20a.

The control unit 30 is a semiconductor integrated circuit that calculates pressure outside the cover member 10 by performing a predetermined process on a detection value detected by the detection element 20. The control unit 30 includes, for example, a Central Processing Unit (CPU) and a memory. The CPU is also referred to as a microprocessor or a processor. The CPU is not limited to a single processor, but may also have a multiprocessor configuration. The memory can be for example a storage unit directly accessed from the CPU. The memory includes a Random Access Memory (RAM) and a Read Only Memory (ROM). The control unit 30 can execute predetermined processing such as a noise removal process in which a filter is applied to the detection values detected by the detection element 20, by the CPU executing a program stored in the memory.

Figure 3:
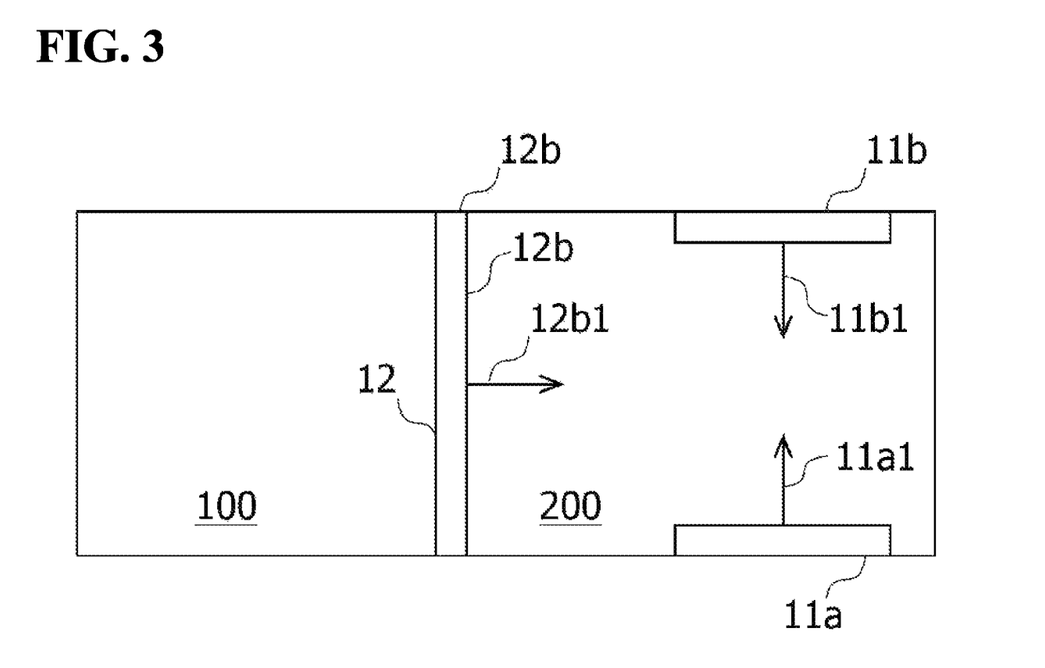
FIG. 3 is a diagram illustrating a positional relationship between through holes and a gap.

FIG. 3 is a view illustrating the positional relationship between the through holes 11a and 11b and the gap 12b, and FIG. 3 is a diagram illustrating the pressure sensor 1 as viewed from above. In FIG. 3, for convenience of illustration, the through holes 11a and 11b and the gap 12b are emphasized by rectangles. As illustrated in FIG. 3, the through holes 11a and 11b are disposed to face each other. The gap 12b is provided at a position where a normal 12b1 on the opening of the gap 12b and a normal 11a1 on the opening of the through hole 11a are orthogonal to each other, and the normal 12b1 on the opening of the gap 12b and a normal 11b1 on the opening of the through hole 11b are orthogonal to each other. Because the through holes 11a and 11b and the gap 12b are disposed in this manner, the direction of the wind flowing in from the through holes 11a and 11b and the direction connecting the introduction chamber 200 and the accommodation chamber 100 through the gap 12b are orthogonal to each other, the wind flowing in from the through holes 11a and 11b is suppressed from flowing into the accommodation chamber 100. Note, that if the positional relationship is such that the inflow of the wind flowing in from at least one of the through holes 11a and 11b into the accommodation chamber 100 is suppressed, the positional relationship between the gap 12b and the through holes 11a and 11b may also be shifted from a position at which the normal 12b1 on the opening of the gap 12b and the normal 11a1 on the opening of the through hole 11a are orthogonal to each other, or may also be shifted from a position at which the normal 12b1 on the opening of the gap 12b and the normal 11b1 on the opening of the through hole 11b are orthogonal to each other.

Furthermore, because the through holes 11a and 11b face each other, the wind flowing in from one of the through holes 11a and 11b can be expected to be discharged from the other of the through holes 11a and 11b as it is. Note, that the pressure sensor 1 is not limited to a configuration in which the through holes 11a and 11b face each other. As long as they are in a range in which the wind flowing in from one of the through holes 11a and 11b is suitably discharged from the other of the through holes 11a and 11b, the through holes 11a and 11b may also be shifted from positions facing each other.

Comparative Example

Figure 4:
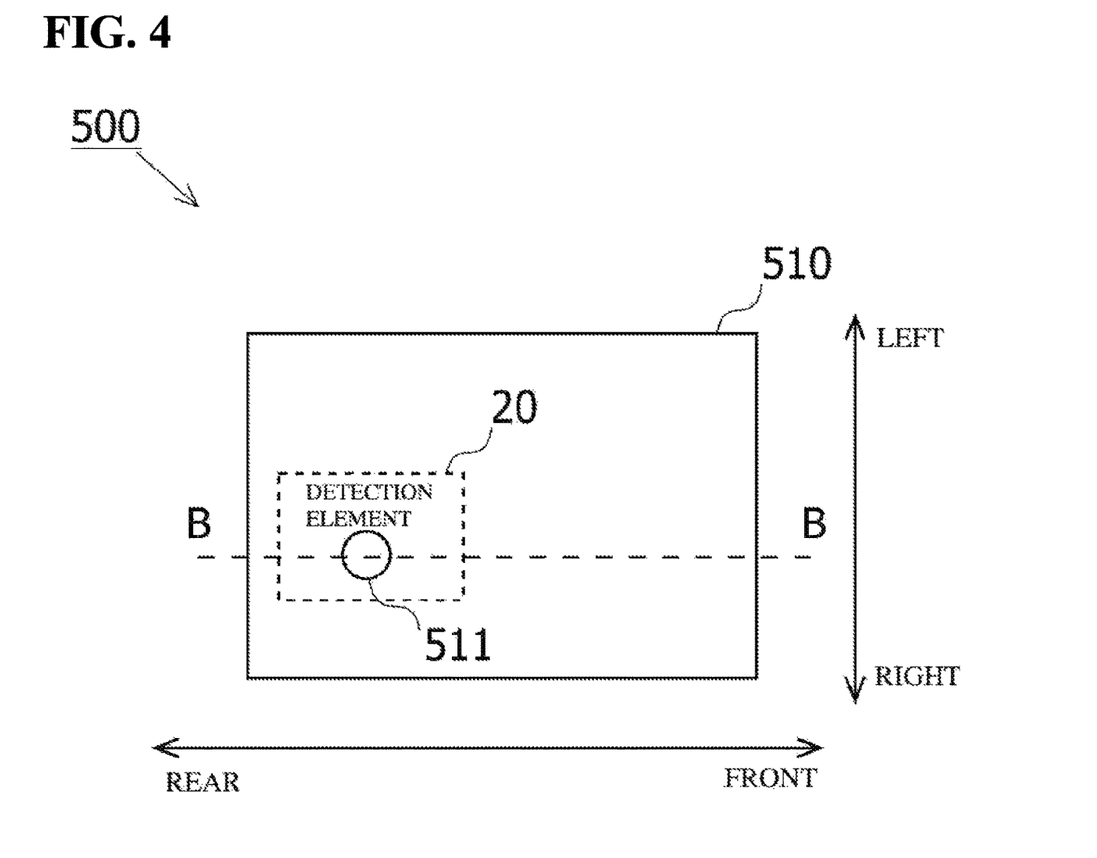
FIG. 4 is an example of a view of a pressure sensor according to a comparative example as viewed from above.

For comparison with the embodiment, a pressure sensor according to a comparative example will be described. FIG. 4 is an example of a view of a pressure sensor 500 according to the comparative example as viewed from above. The pressure sensor 500 includes a package member 510 that includes an introduction hole 511. Hereinafter, in the description of the comparative example, the same components as those of the embodiment are denoted by the same reference numbers, and description thereof will be omitted.

The introduction hole 511 is a through hole for introducing pressure into the inside of the pressure sensor 500. In FIG. 4, the introduction hole 511 is provided at a position in which the introduction hole 511 and the detection element 20 overlap each other when the introduction hole 511 is viewed from the front. The pressure outside the pressure sensor 500 is introduced into the inside of the pressure sensor 500 through the introduction hole 511.

Figure 5:
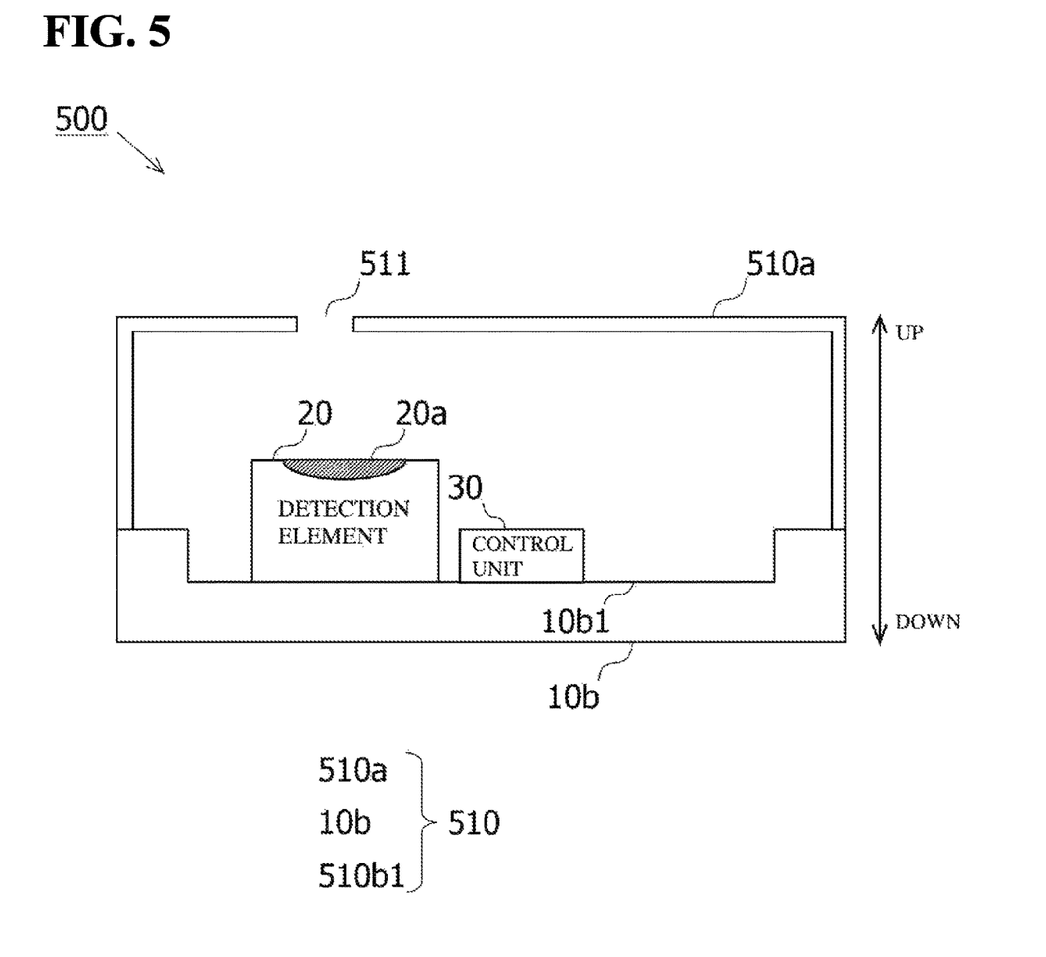
FIG. 5 is an example of a cross-sectional view taken along line B-B in FIG. 4.

FIG. 5 is an example of a cross-sectional view taken along line B-B in FIG. 4. The package member 510 includes an upper package 510a and a lower cover 10b. The package member 510 differs from the cover member 10 according to the embodiment in that, in the upper package 510a, the package member does not include the wall portion 12 and the through holes 11a and 11b, and includes the introduction hole 511.

Figure 6:
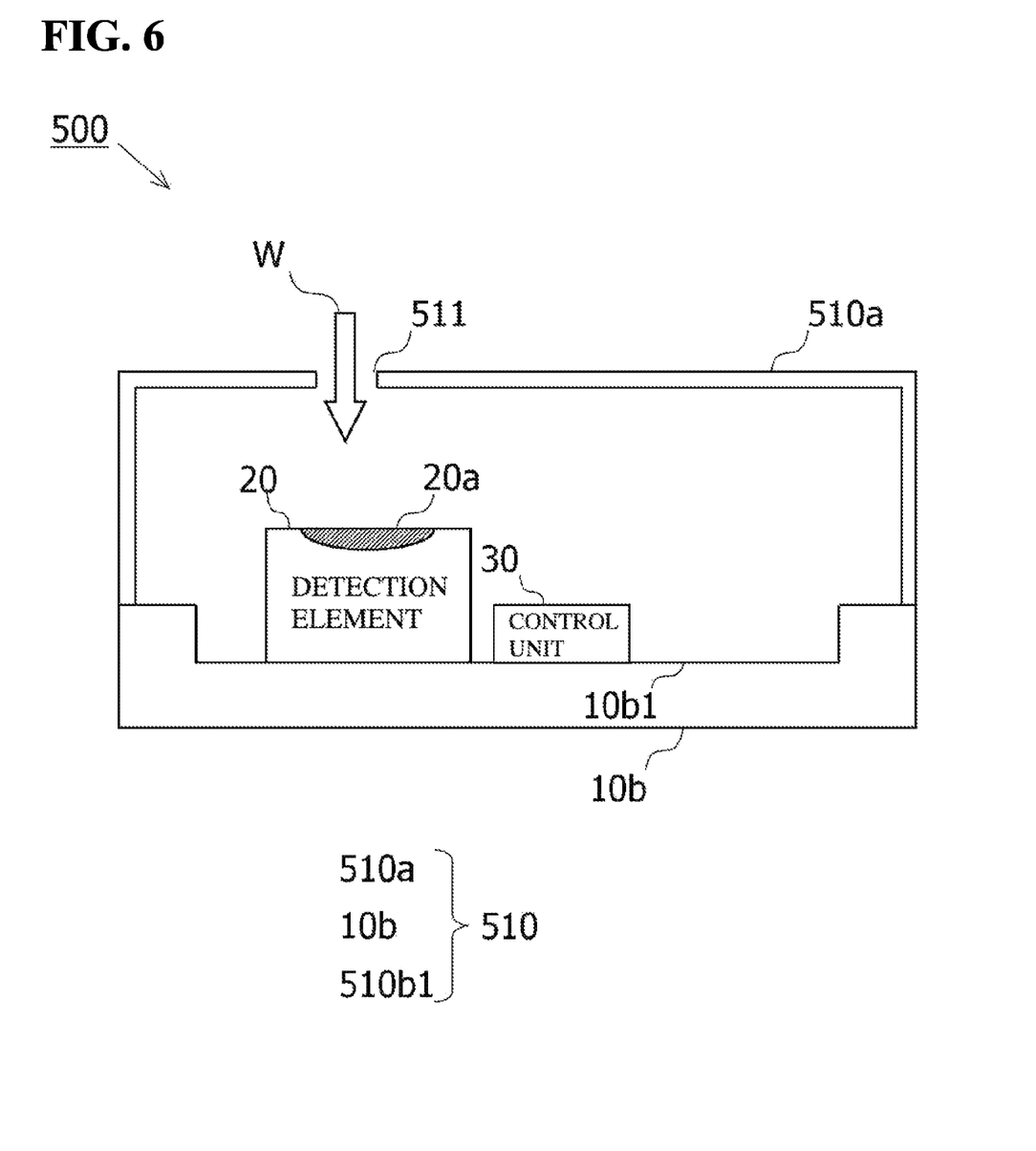
FIG. 6 is a diagram exemplifying wind flowing into the inside of the pressure sensor from an introduction hole in the pressure sensor according to the comparative example.

FIG. 6 is a diagram exemplifying wind flowing into the inside of the pressure sensor 500 from the introduction hole 511 in the pressure sensor 500 according to the comparative example. In FIG. 6, an arrow W schematically illustrates the wind flowing into the inside of the package member 510 from the introduction hole 511. Hereinafter, in this specification, the wind exemplified by the arrow W will be referred to as a wind W. In the pressure sensor 500 according to the comparative example, as described above, the introduction hole 511 and the detection element 20 are provided at positions overlapping each other in a front view of the introduction hole 511. Accordingly, the wind W flowing in from the introduction hole 511 presses a detection surface 20a of the detection element 20, so that the detection accuracy of the pressure by the detection element 20 decreases. In addition, because the package member 510 has no through hole other than the introduction hole 511, the wind flowing into the inside of the pressure sensor 500 is not discharged from the pressure sensor 500, and the pressure inside the pressure sensor 500 tends to increase. Therefore, in the pressure sensor 500 according to the comparative example, due to the inflow of the wind W, the detection accuracy of the pressure by the detection element 20 decreases. In the comparative example, even if the introduction hole 511 is provided at the position that does not overlap the detection element 20 when the introduction hole 511 is viewed from the front, the pressure inside the pressure sensor 500 increases due to the inflow of the wind W, and thus the detection accuracy of the pressure by the detection element 20 decreases.

Figure 7:
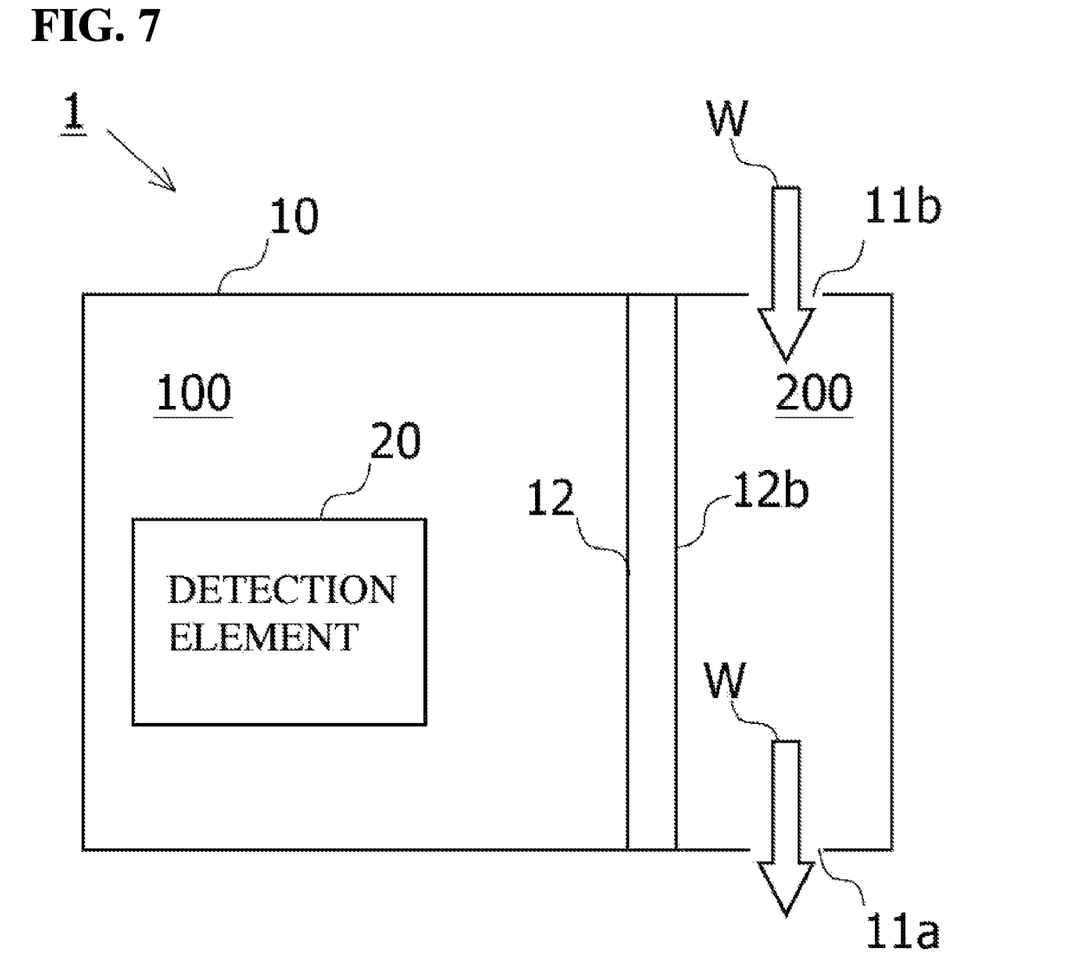
FIG. 7 is a diagram exemplifying wind flowing into the inside of the pressure sensor from the through hole in the pressure sensor according to the embodiment.

FIG. 7 is a diagram exemplifying the wind W flowing into the inside of the pressure sensor 1 from the through hole 11b in the pressure sensor 1 according to the embodiment. FIG. 7 is an example of a perspective view in which the upper cover 10a included in the pressure sensor 1 is seen through when the upper cover 10a is viewed from the front. The wind W flowing into the introduction chamber 200 through the through hole 11b is guided by the wall portion 12 to the through hole 11a facing the through hole 11b, and is discharged from the introduction chamber 200 through the through hole 11a. Accordingly, an increase in the pressure inside the introduction chamber 200 due to the inflow of the wind W is suppressed. Furthermore, because the through holes 11a and 11b are provided at positions that do not overlap the detection element 20 in a front view, the detection element 20 is also prevented from being pressed by the wind flowing into the inside of the cover member 10 from the through holes 11a and 11b. Therefore, the pressure sensor 1 according to the embodiment can suppress a decrease in detection accuracy due to the inflow of wind into the cover member 10, compared to the pressure sensor 500 according to the comparative example.

Furthermore, because both of the through holes 11a and 11b are provided at positions that do not overlap the detection element in respective front views, adhesion of dust exemplified by dust and dirt to the detection element 20 is reduced, compared to the pressure sensor 500 according to the comparative example. Therefore, according to the pressure sensor 1 of the embodiment, erroneous detection of pressure due to adhesion of dust is reduced.

First Modification

Figure 8:
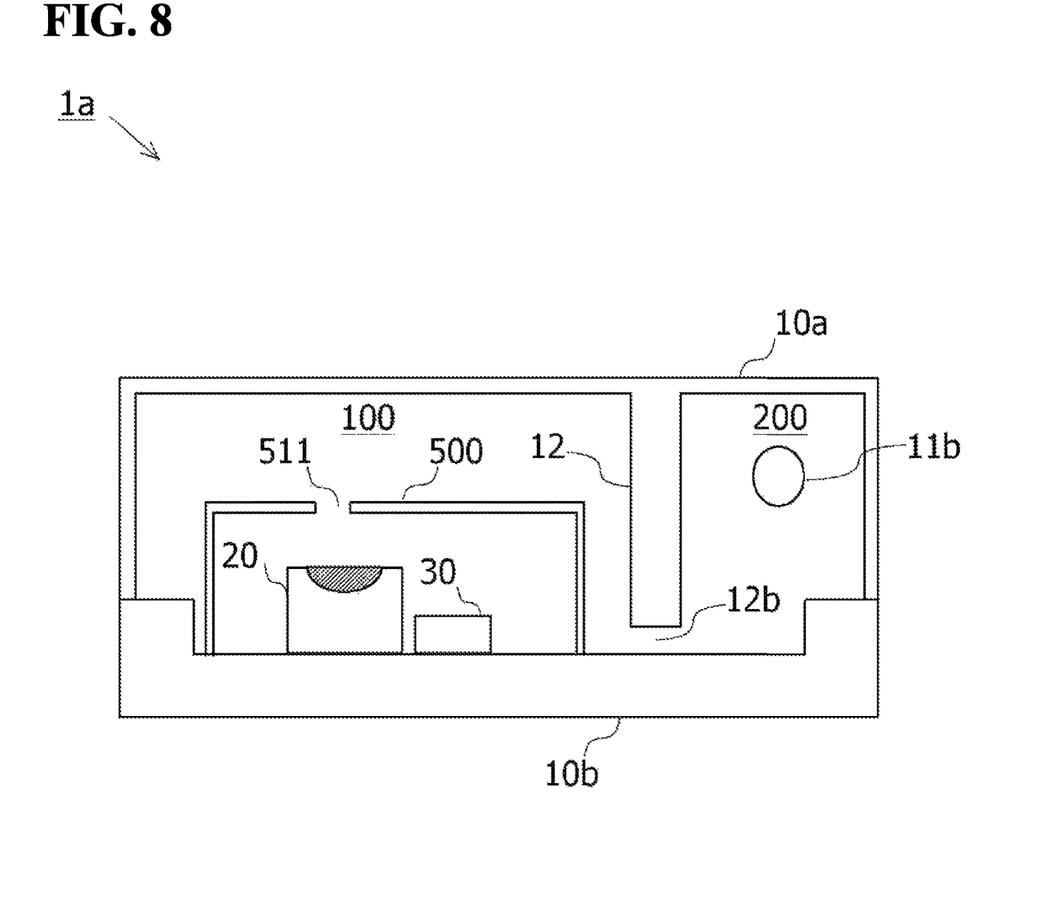
FIG. 8 is a diagram illustrating an example of a pressure sensor according to a first modification.

In the embodiment, the cover member 10 accommodates the detection element 20, but the cover member 10 may also accommodate the pressure sensor 500 according to the comparative example. FIG. 8 is a diagram illustrating an example of a pressure sensor 11a according to a first modification. In the pressure sensor 11a, the pressure sensor 500 accommodated in the cover member 10 and the cover member 10 share the lower cover 10b. Also in the pressure sensor 11a according to the first modification, the wind flowing into the inside of the cover member 10 from one of the through holes 11a and 11b is discharged from the other of the through holes 11a and 11b. Furthermore, as described above, because each of the through holes 11a and 11b is provided in a region that does not overlap the detection element 20 in a front view, the wind flowing in through the through holes 11a and 11b is prevented from pressing the detection element 20. Accordingly, the pressure sensor 11a according to the first modification also suppresses a decrease in detection accuracy due to the inflow of wind into the inside of the pressure sensor 1*a*. Note, that in FIG. 8, the introduction hole 511 is provided at a position that overlaps the detection element 20 in a front view, but the position of the introduction hole 511 is not limited to such a position. The introduction hole 511 may also be provided in a region that does not overlap the detection element 20.

Second Modification

Figure 9:
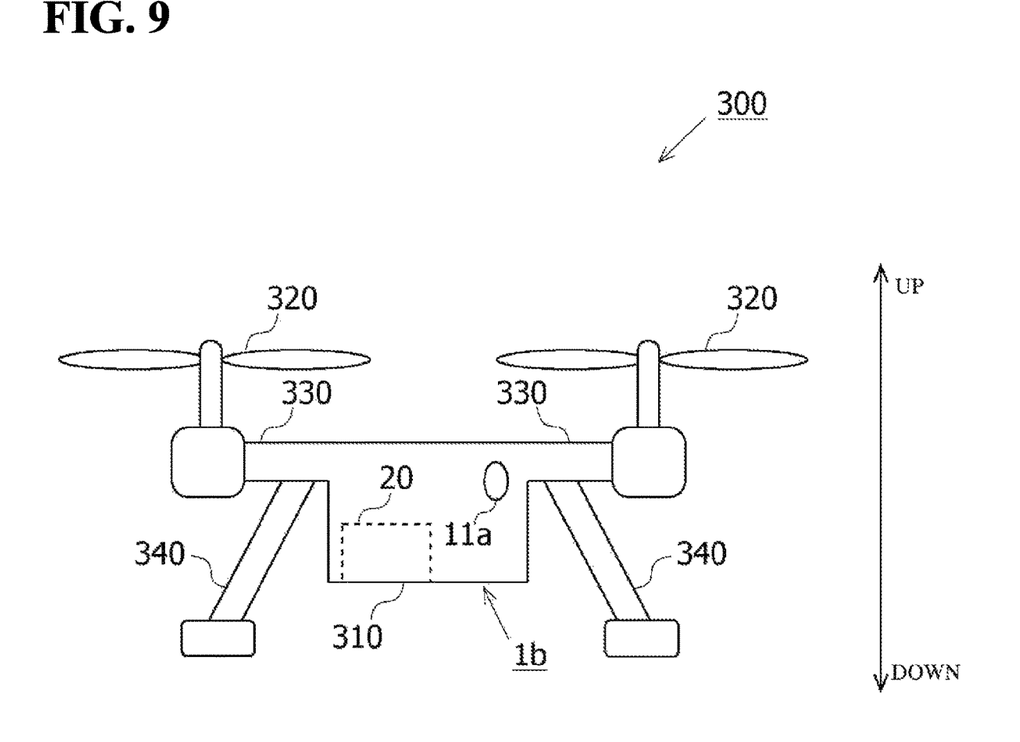
FIG. 9 is a first diagram illustrating an example of a pressure sensor according to a second modification.
Figure 10:
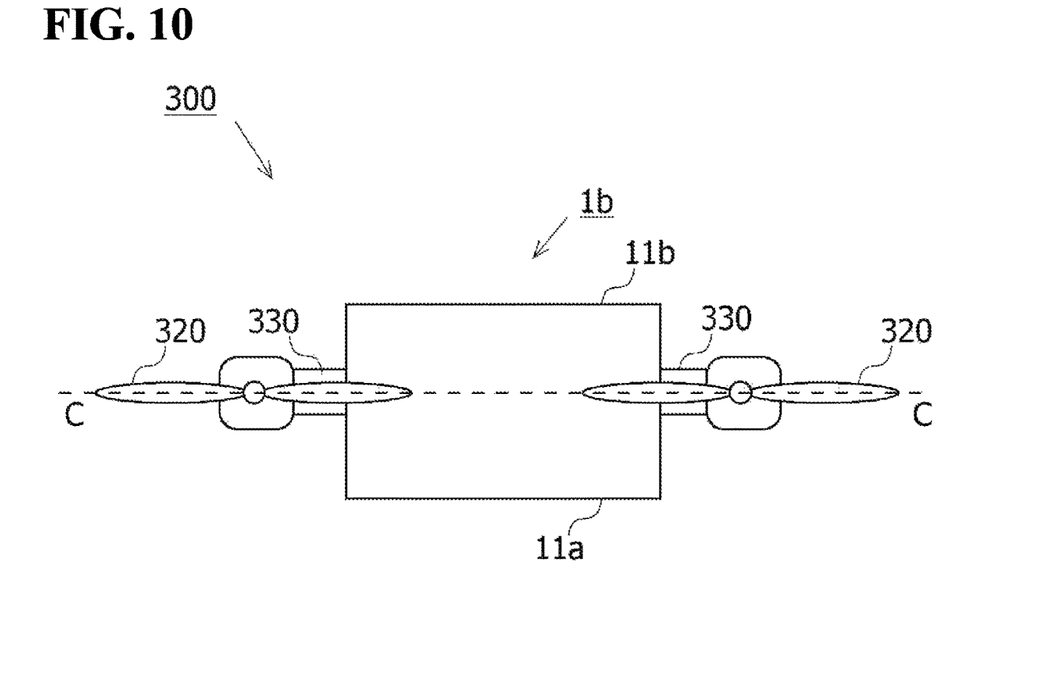
FIG. 10 is a second diagram illustrating an example of the pressure sensor according to the second modification.

FIGS. 9 and 10 are diagrams illustrating an example of a pressure sensor 1*b* according to a second modification. FIG. 9 is an example of a side view of a drone 300, and FIG. 10 is an example of a top view of the drone 300. The drone 300 is a device that can fly by rotating propellers 320 coupled to a housing 310 via arm portions 330, and that is supported by legs 340 at the time of landing. In the second modification, the cover member 10 of the pressure sensor 1 according to the embodiment also serves as the housing 310 of the drone 300. That is to say, in the drone 300, the detection element 20 is provided in the housing 310, and the pressure introduced through the through holes 11*a* and 11*b* can be detected by the detection element 20. The drone 300 is an example of a "moving device having a pressure sensor". The propellers 320 are examples of a "moving means" and a "flying means".

Figure 11:
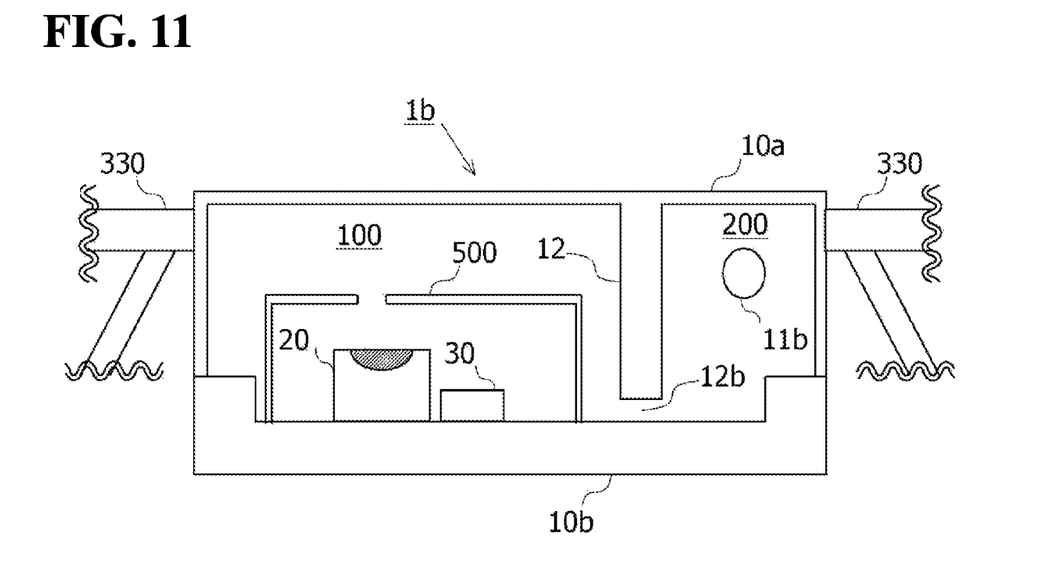
FIG. 11 is an example of a cross-sectional view taken along line C-C in FIG. 10.

FIG. 11 is an example of a cross-sectional view taken along line C-C in FIG. 10. In the drone 300 according to the second modification, as described above, the cover member 10 of the pressure sensor 1 according to the embodiment also serves as the housing 310 of the drone 300. Accordingly, similarly to the embodiment, also in the drone 300, a decrease in detection accuracy due to the inflow of wind into the inside of the pressure sensor 11*b* is suppressed. Note, that because the drone 300 generates wind by rotating the propellers 320, it is preferable that the through holes 11*a* and 11*b* be disposed in places that are less likely to receive wind from the propellers 320.

In the second modification, the drone 300 is given as an example of a moving device, but the moving device having a pressure sensor according to the embodiment and the modifications is not limited to the drone 300. The moving device may also be, for example, a vehicle including a wheel serving as a moving means. Examples of the vehicle include an automobile and a bicycle, for example.

Other Modifications

In the embodiment, the inside of the pressure sensor 1 is divided by the wall portion 12 into the accommodation chamber 100 that accommodates the detection element 20 and the introduction chamber 200 in which the through holes 11*a* and 11*b* are provided. However, the disclosed technique is not limited to a configuration including the wall portion 12. In the pressure sensor 1, even when the wall portion 12 is not provided, the wind flowing into the inside of the pressure sensor 1 from one of the through holes 11*a* and 11*b* is discharged from the other of the through holes 11*a* and 11*b*. It is preferable that the pressure sensor 1 includes the wall portion 12. However, even when the pressure sensor 1 does not include the wall portion 12, the influence of the wind on the detection accuracy of pressure is reduced. In the embodiment, the gap 12*b* that is formed between the wall portion 12 and the bottom surface 10*b*1 is given as an example of the "communication hole". However, the "communication hole" is not limited to the gap 12*b*, and the shape, size, and the like of the communication hole may be determined as suitable, as long as the communication hole allows the accommodation chamber 100 and the introduction chamber 200 to communicate with each other. Furthermore, in the embodiment, the wall portion 12 protrudes from the inner wall of the upper cover 10*a* toward the lower cover 10*b*. However, the wall portion 12 is not limited to such a form, and may be any wall portion that divides the inside of the pressure sensor 1 into the accommodation chamber 100 and the introduction chamber 200, and that communicates the accommodation chamber 100 and the introduction chamber 200 through the communication hole. The wall portion 12 may also protrude, for example, from the bottom surface 10*b*1 toward the upper cover, or may protrude from one of the left and right inner walls of the cover member 10 toward the other. Alternatively, the wall portion 12 may also close the space between the accommodation chamber 100 and the introduction chamber 200, and a "communication hole" through which the accommodation chamber 100 and the introduction chamber 200 communicate with each other may also be provided at any place of the wall portion 12. In the embodiment, the wall portion 12 is provided to divide the inside of the pressure sensor 1 into the rear accommodation chamber 100 and the front introduction chamber 200. However, the wall portion 12 may also be provided to divide the inside of the pressure sensor 1 into the accommodation chamber 100 and the introduction chamber 200 in the vertical direction.

Example of Combination with Other Sensors

Figure 12:
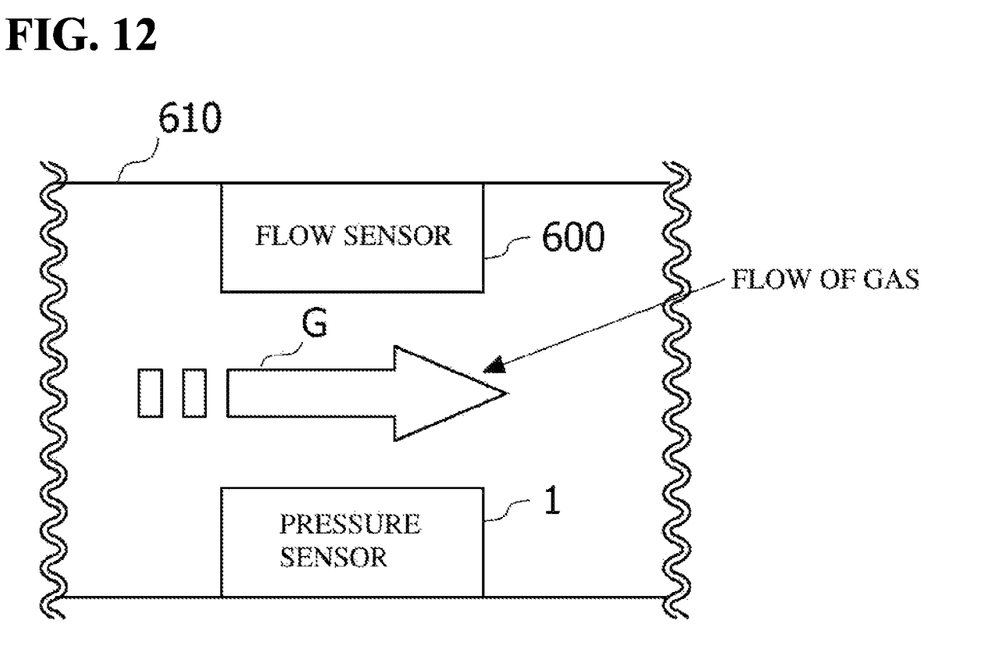
FIG. 12 is a diagram showing a usage example in which the pressure sensor according to the embodiment is combined with a flow sensor.

FIG. 12 is a diagram showing a usage example in which the pressure sensor 1 according to the embodiment is combined with a flow sensor 600. Gas flows in a flow path 610 in a direction indicated by an arrow G in FIG. 12, and the flow sensor 600 measures a flow velocity and a flow rate of the gas flowing in the flow path 610. As described above, because the influence of the wind on the detection accuracy of the pressure is suppressed, the pressure sensor 1 according to the embodiment can be installed in an environment in which gas flows through the flow path 610 as exemplified, and can accurately detect the pressure in the environment.

The embodiment and the modifications disclosed above can be combined.

INDEX TO THE REFERENCE NUMERALS

1, 1*a*, 1*b*, 500 . . . pressure sensor
10 . . . cover member
10*a* . . . upper cover
10*b* . . . lower cover
10*b*1 . . . bottom surface
11*a*, 11*b* . . . through hole
12 . . . wall portion
12*a* . . . end portion
12*b* . . . gap
20 . . . detection element
20*a* . . . detection surface
30 . . . control unit
100 . . . accommodation chamber
200 . . . introduction chamber
300 . . . drone
310 . . . housing
320 . . . propeller
330 . . . arm portion
510 . . . package member
510*a* . . . upper package
511 . . . introduction hole
600 . . . flow sensor
610 . . . flow path
G . . . arrow
W . . . wind

The invention claimed is:

1. A pressure sensor, comprising:
   a detection element for detecting a change in pressure; and
   a cover member that accommodates the detection element in an inner space of the cover member, and that is formed in a cuboid shape, wherein
   a first through hole and a second through hole are respectively provided at positions, which do not overlap the detection element in respective front views, in side walls of the cover member that are facing each other,
   the cover member comprises a wall portion that divides the inside of the cover member into a first chamber and a second chamber, and that comprises a communication hole that links the first chamber and the second chamber,
   the first through hole and the second through hole are provided in the second chamber of the cover member, and
   the detection element is accommodated in the first chamber.

2. The pressure sensor according to claim 1, wherein
   the first through hole and the second through hole are disposed to face each other.

3. A moving device having a pressure sensor, the moving device comprising:
   the pressure sensor according to claim 2; and
   a moving means that is coupled to the pressure sensor, wherein
   the moving device is configured to be movable.

4. The moving device having a pressure sensor according to claim 3, wherein
   the moving means comprises a flying means for flying the moving device.

5. The pressure sensor according to claim 1, wherein
   a normal on the opening of the first through hole and a normal on the opening of the communication hole are orthogonal to each other, and a normal on the opening of the second through hole and the normal on the opening of the communication hole are also orthogonal to each other.

6. The pressure sensor according to claim 5, wherein
   the detection element is covered by a package member comprising an introduction hole, and
   the cover member accommodates the detection element, which is covered by the package member, in the first chamber.

7. A moving device having a pressure sensor, the moving device comprising:
   the pressure sensor according to claim 5; and
   a moving means that is coupled to the pressure sensor, wherein
   the moving device is configured to be movable.

8. The moving device having a pressure sensor according to claim 7, wherein
   the moving means comprises a flying means for flying the moving device.

9. The pressure sensor according to claim 1, wherein
   the detection element is covered by a package member comprising an introduction hole, and
   the cover member accommodates the detection element, which is covered by the package member, in the first chamber.

10. A moving device having a pressure sensor, the moving device comprising:
    the pressure sensor according to claim 9; and
    a moving means that is coupled to the pressure sensor, wherein
    the moving device is configured to be movable.

11. The moving device having a pressure sensor according to claim 10, wherein
    the moving means comprises a flying means for flying the moving device.

12. A moving device having a pressure sensor, the moving device comprising:
    the pressure sensor according to claim 1; and
    a moving means that is coupled to the pressure sensor, wherein
    the moving device is configured to be movable.

13. The moving device having a pressure sensor according to claim 6, wherein
    the moving means comprises a flying means for flying the moving device.

* * * * *